(12) United States Patent
Curran et al.

(10) Patent No.: US 10,832,190 B2
(45) Date of Patent: *Nov. 10, 2020

(54) EXECUTABLE ACTION MODIFICATION

(71) Applicant: INTERNATIONAL BUSINESS MACHINES CORPORATION, Armonk, NY (US)

(72) Inventors: Mary Curran, Apex, NC (US); Lori Adington, Raleigh, NC (US); Dana L. Price, Surf City, NC (US); Eduardo M. Breijo-Baullosa, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 230 days.

This patent is subject to a terminal disclaimer.

(21) Appl. No.: 15/815,161

(22) Filed: Nov. 16, 2017

(65) Prior Publication Data

US 2019/0147389 A1 May 16, 2019

(51) Int. Cl.
*G06Q 10/06* (2012.01)
*H04W 4/02* (2018.01)
(Continued)

(52) U.S. Cl.
CPC ..... *G06Q 10/063116* (2013.01); *G06N 20/00* (2019.01); *G06Q 10/06316* (2013.01); *G06Q 10/1093* (2013.01); *H04W 4/02* (2013.01)

(58) Field of Classification Search
CPC ..... G06Q 10/063116; G06Q 10/06316; G06Q 10/1093; G06N 20/00; H04W 4/02
See application file for complete search history.

(56) References Cited

U.S. PATENT DOCUMENTS 6,940,395 B2 * 9/2005 Steinmark ............. G08B 21/24
340/309.16
8,560,371 B2 10/2013 Levitt
(Continued)

FOREIGN PATENT DOCUMENTS

KR 20170129689 * 6/2016

OTHER PUBLICATIONS

Doppelt, Yaron. "Implementation and assessment of project-based learning in a flexible environment." International journal of technology and design education 13.3 (2003): 255-272. (Year: 2003).*
(Continued)

*Primary Examiner* — Matthew S Gart
*Assistant Examiner* — Hamzeh M Obaid
(74) *Attorney, Agent, or Firm* — Schmeiser, Olsen & Watts; Maeve M. Carpenter (57) ABSTRACT

A method and system for improving an action implementation process is provided. The method includes detecting a cancelation or a rescheduling for an originally planned activity of a user to be performed during a first time period. An alternative activity for replacement of the originally planned activity is determined. It is determined that a second time period necessary for performing the alternative activity exceeds the first time period and in response, an executable action is generated. The executable action is configured to be combined with the alternative activity such that the alternative activity may be accommodated. Machine learning software code is executed top determine if the user would be likely to accept the alternative activity if the additional executable action exceeds a specified threshold. In response, the executable action is automatically executed in real time thereby enabling the alternative activity.

12 Claims, 5 Drawing Sheets

(51) Int. Cl.
*G06Q 10/10* (2012.01)
*G06N 20/00* (2019.01)

(56) References Cited

U.S. PATENT DOCUMENTS

| | | | |
|---|---|---|---|
| 9,329,975 B2* | 5/2016 | Park | G06F 11/3636 |
| 2002/0035493 A1* | 3/2002 | Mozayeny | G06Q 10/02 |
| | | | 705/5 |
| 2002/0116232 A1* | 8/2002 | Rapp | G06Q 10/02 |
| | | | 705/5 |
| 2007/0300163 A1* | 12/2007 | Alford | G06Q 10/109 |
| | | | 715/751 |
| 2008/0028317 A1 | 1/2008 | Castelli et al. | |
| 2009/0259674 A1 | 10/2009 | Griffin et al. | |
| 2011/0072372 A1 | 3/2011 | Fritzley et al. | |
| 2012/0227005 A1 | 9/2012 | Anton et al. | |
| 2012/0300598 A1* | 11/2012 | Murray | G04G 13/02 |
| | | | 368/251 |
| 2013/0066546 A1 | 3/2013 | Meisels et al. | |
| 2013/0315041 A1 | 11/2013 | Hiremath et al. | |
| 2013/0325763 A1* | 12/2013 | Cantor | G06Q 10/06 |
| | | | 706/12 |
| 2014/0067455 A1* | 3/2014 | Zhang | G06Q 10/109 |
| | | | 705/7.24 |
| 2014/0074535 A1* | 3/2014 | Woo-Kwan-Chung | |
| | | | G06Q 10/1095 |
| | | | 705/7.19 |
| 2014/0101189 A1 | 4/2014 | Schenkel | |
| 2014/0136259 A1* | 5/2014 | Kinsey, II | G06Q 10/06311 |
| | | | 705/7.16 |
| 2014/0237464 A1* | 8/2014 | Waterman | G06F 8/65 |
| | | | 717/172 |
| 2014/0289140 A1 | 9/2014 | Vijayant | |
| 2014/0372525 A1 | 12/2014 | Raghavan et al. | |
| 2015/0058054 A1* | 2/2015 | Basu | G06Q 10/06311 |
| | | | 705/7.13 |
| 2016/0189111 A1 | 6/2016 | Bookallil et al. | |
| 2017/0140285 A1* | 5/2017 | Dotan-Cohen | G06F 3/038 |
| 2018/0081324 A1* | 3/2018 | Sharoni | G04G 13/021 |
| 2018/0285827 A1* | 10/2018 | Dotan-Cohen | G06Q 10/1095 |

OTHER PUBLICATIONS

IBM; System and Method for Arbitrating Free Time; IPCOM000133821D; IP.com; Feb. 10, 2006; 5 pages.

* cited by examiner

EXECUTABLE ACTION MODIFICATION

FIELD

The present invention relates generally to a method for executing an action and in particular to a method and associated system for improving a real time action execution process with respect modifying hardware and machine code software implemented actions.

BACKGROUND

Accurately implementing specified software functions typically includes an inaccurate process with little flexibility. Generating replacement modification functions associated with software may include a complicated process that may be time consuming and require a large amount of resources. Accordingly, there exists a need in the art to overcome at least some of the deficiencies and limitations described herein above.

SUMMARY

A first aspect of the invention provides an executable action implementation improvement method comprising: detecting, by a processor of a hardware device, an executable action associated with a cancelation or a rescheduling for an originally planned activity of a user to be performed during a first time period; first determining, by the processor, an alternative activity for replacement of the originally planned activity during the first time period; second determining, by the processor, that a second time period necessary for performing the alternative activity exceeds the first time period; third determining, by the processor, an additional executable action for combining with the alternative activity such that the alternative activity may be accommodated; additionally determining, by the processor based on analyses of user based data and execution of machine learning software code, if the user would be likely to accept the alternative activity if the additional executable action exceeds a specified threshold; and automatically executing in real time, by the processor, the additional executable action thereby enabling the alternative activity.

A second aspect of the invention provides a computer program product, comprising a computer readable hardware storage device storing a computer readable program code, the computer readable program code comprising an algorithm that when executed by a processor of a hardware device implements an executable action implementation improvement method, the method comprising: detecting, by the processor, an executable action associated with a cancelation or a rescheduling for an originally planned activity of a user to be performed during a first time period; first determining, by the processor, an alternative activity for replacement of the originally planned activity during the first time period; second determining, by the processor, that a second time period necessary for performing the alternative activity exceeds the first time period; third determining, by the processor, an additional executable action for combining with the alternative activity such that the alternative activity may be accommodated; additionally determining, by the processor based on analyses of user based data and execution of machine learning software code, if the user would be likely to accept the alternative activity if the additional executable action exceeds a specified threshold; and automatically executing in real time, by the processor, the additional executable action thereby enabling the alternative activity.

A third aspect of the invention provides a hardware device comprising a processor coupled to a computer-readable memory unit, the memory unit comprising instructions that when executed by the computer processor implements an executable action implementation improvement method comprising: detecting, by the processor, an executable action associated with a cancelation or a rescheduling for an originally planned activity of a user to be performed during a first time period; first determining, by the processor, an alternative activity for replacement of the originally planned activity during the first time period; second determining, by the processor, that a second time period necessary for performing the alternative activity exceeds the first time period; third determining, by the processor, an additional executable action for combining with the alternative activity such that the alternative activity may be accommodated; additionally determining, by the processor based on analyses of user based data and execution of machine learning software code, if the user would be likely to accept the alternative activity if the additional executable action exceeds a specified threshold; and automatically executing in real time, by the processor, the additional executable action thereby enabling the alternative activity.

The present invention advantageously provides a simple method and associated system capable of accurately implementing specified functions.

DETAILED DESCRIPTION

Figure 1:
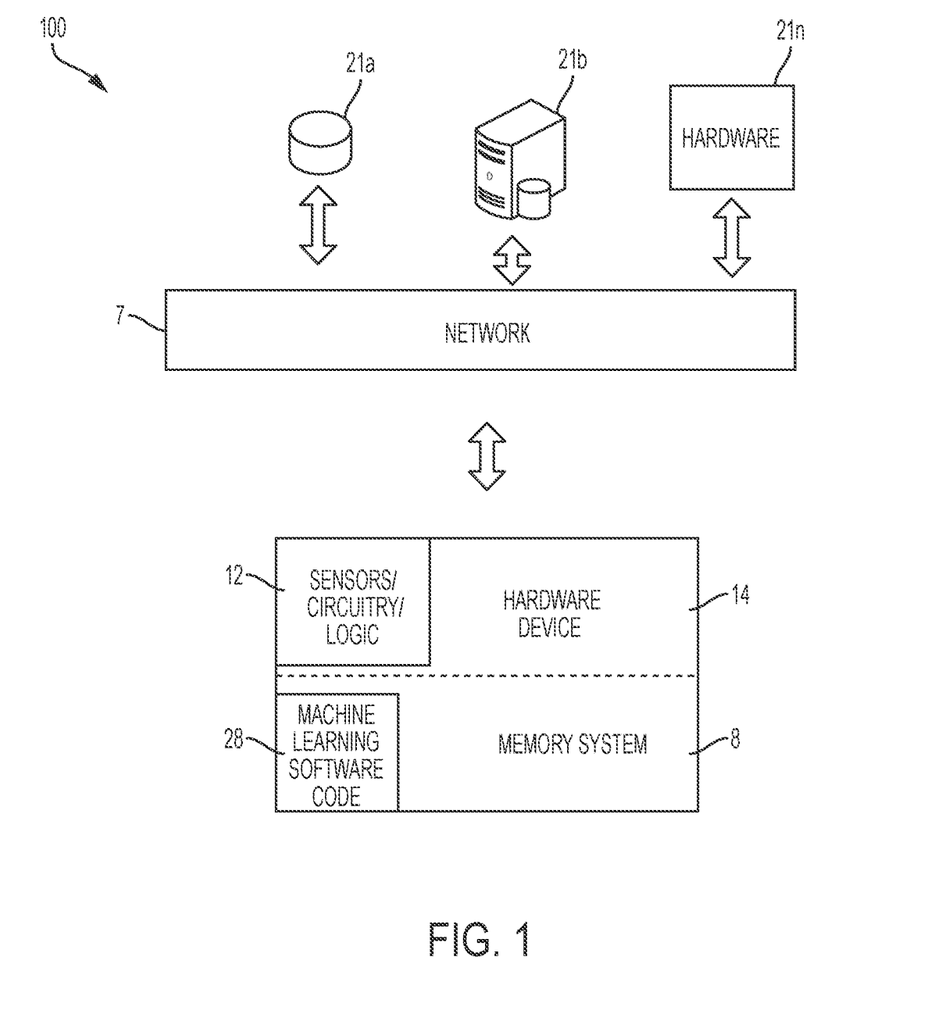
FIG. 1 illustrates a system for improving a real time action execution process with respect to modifying hardware and software implemented actions, in accordance with embodiments of the present invention.

FIG. 1 illustrates a system 100 for improving a real time action execution process with respect to modifying hardware and software implemented actions, in accordance with embodiments of the present invention. System 100 is enabled to analyze user hardware and software execution patterns and preferences in order to modify hardware and software actions for execution. For example, a hardware device 14 may receive a notification associated with a change in a user schedule and in response, the hardware device 14 may determine an available timeframe (for executing an action due) to the change in the schedule. Additionally, based on user activity patterns/preferences, an alternate activity for the user may be selected to be executed during the available timeframe and an associated hardware or software action necessary to schedule the alternate activity is generated. The hardware or software action is executed resulting in the alternate activity being automatically scheduled within a user software implemented schedule. The user activity patterns may be determined based on analysis of social network activity, a sensed location of the user, a sensed activity of the user, etc. System 100 is configured to automatically apply user preferences or known user patterns with respect to preferred activities in order to automatically select an optimal notification time to allow sufficient time for the completion of the preferred activities. Based on the user preferences, system 100 may additionally execute proactive actions (e.g., automatically resetting an alarm time for execution on a hardware device, automatically canceling a low priority meeting within a software system, etc.) to provide additional time for completion of preferred activities. System 100 enables the following example process for modifying hardware and software implemented actions:

System 100 executes machine learning software code 28 for mining of user activity patterns retrieved from, inter alia, social network systems, activity tracker hardware, global positioning satellite (GPS) trackers, etc. For example, user activity patterns may include, inter alia: taking the dogs on a half hour walk 5 days per week (Monday-Friday); performing an hour run 3 days per week (Monday, Wednesday, and Friday); going to the gym 2 days per week (Tuesday and Thursday); having dinner with a friend once per week; etc. Additionally, the user may provide optional user preferences such as, inter alia: allowing system 100 to automatically execute hardware and software actions to change alarm times with the following example limitations: only within a 30 minute time range, only if a full workout may be accomplished, always with no restrictions, allowing system 100 to automatically cancel any low priority meetings, automatically identify abnormal schedules (e.g., vacations, conferences, family in town, etc.). The action modification process is automatically initialized when system 100 receives a notification indicating that a meeting has been canceled or rescheduled. In response, hardware device 14 detects a free time period for the user, analyzes the typical user activity patterns previously retrieved, and automatically selects an alternate activity based on the analyses. Additionally, hardware device 14 determines a software or hardware implemented action and associated timeframe for enabling completion of the alternate activity. The software or hardware implemented action is executed at an associated time. For example, an alarm action time may be changed, a wearable hardware device may be activated to initialize an alarm, a text message may be automatically generated, an activity tracker route may be adjusted, etc.

System 100 enables the following an implementation example for modifying hardware and software implemented actions:

In response to initializing the process, a user's activity pattern illustrates that he/she usually goes for a one hour run on Monday mornings, never gets up before 5:45 am EST, and usually goes into the office at 9 am EST. Additionally, the user has enabled hardware device 14 to allow automated changes to be executed with respect to modifying alarm times. Subsequently, hardware device determines that the user has a scheduled meeting at 8 am EST on Monday thereby eliminating a time period for performing a normal run. Additionally, the user has an alarm set to go off at 6:30 am EST thereby providing an hour to get ready and a half hour to drive to work. At 2 am EST, the scheduled meeting is rescheduled (for 8:30 am EST) by the meeting organizer living in England. In response, hardware device 14 receives a notification indicating the change in the meeting time and automatically detects 30 free minutes in the user's schedule. Additionally, hardware device 14 determines a typical user pattern of a 60 minute run on Monday mornings. In response, hardware device 14 selects 60 minute run alternate activity and determines that the user must wake up 30 minutes earlier than usual to accommodate the alternate run. Therefore, hardware device 14 automatically transmits a control signal for activating circuitry of an alarm system (e.g., one of devices 21a . . . 21n) thereby resetting an alarm to 6 am to allow for the alternate activity of an hour run. Additionally, hardware device automatically generates and transmits a text notification to a mobile device at 6:05 am to inform the user of the time and activity modification.

System 100 of FIG. 1 includes devices 21a . . . 21n connected through a network 7 to a hardware device 14. Hardware device 14 comprises sensors/circuitry/logic 12 and a memory system 8. Memory system 8 comprises machine learning software code 28. Devices 21a . . . 21n and hardware device 14 each may comprise an embedded device. An embedded device is defined herein as a dedicated device or computer comprising a combination of computer hardware and software (fixed in capability or programmable) specifically designed for executing a specialized action. Programmable embedded computers or devices may comprise specialized programming interfaces. In one embodiment, devices 21a . . . 21n and hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-5. The specialized discrete non-generic analog, digital, and logic based circuitry (e.g., sensors/circuitry/logic 12, machine learning software code 28, etc.) may include proprietary specially designed components (e.g., a specialized integrated circuit, such as for example an Application Specific Integrated Circuit (ASIC) designed for only implementing an automated process for improving a real time action execution process with respect to modifying hardware and software implemented actions. The memory system 8 may include a single memory system. Alternatively, the memory system 8 may include a plurality of memory systems. Network 7 may include any type of network including, inter alia, a local area network, (LAN), a wide area network (WAN), the Internet, a wireless network, etc. Sensors/circuitry/logic 12 may include any type of internal or external sensors including, inter alia, GPS sensors, activity tracking sensors, social network code based sensors, a heart rate monitor, a blood pressure monitor, a temperature sensor, a pulse rate monitor, an ultrasonic sensor, an optical sensor, a video retrieval device, humidity sensors, etc.

System 100 enables the following process for modifying hardware and software implemented actions:

The process is initialized when hardware device 14 detects an original activity being canceled or rescheduled. For example, a meeting being canceled in an electronic calendar, a sporting event being canceled with respect to a sports application on a device, a TV episode being rescheduled with respect to a digital TV guide, dinner plan cancellation via text message, etc. In response, hardware device 14 determines that an alternate, desirable activity doesn't exactly fit into the original activity's timeframe and determines one or more additional actions to accommodate the activity into the user's schedule. Hardware device 14 further determines a likelihood of the user accepting an alternate activity with respect to additional actions exceeding a specified acceptance threshold. The aforementioned determination may be generated based on, inter alia, a software code machine learning from previous acceptance(s), digital user preferences, a determined passion for the alternate activity detected digitally in social networks, via digital Web based trackers, etc. In response to the user acceptance determination, hardware device 14 executes one or more digitally implemented actions to enable the accommodation of the alternate activity. For example, an optional pre-acceptance of proposed changes, a machine implemented change to a bedside or digital alarm, a wearable device alarm execution, an automated text message generated and transmitted to a mobile device, an automated running route adjustment on an activity tracker, an automated cancelation of low priority meetings, etc. Additionally, hardware device 14 receives digital feedback from the user via user preferences or via machine learning of user's acceptances of alternate activities and determines preferences for future threshold determinations such as, inter alia: only automatically adjusting up to a 30 minute time difference, specified activities will always be accepted with no restrictions, activities may be accommodated by cancelling priority meetings, specified activities may or may not be accommodated during abnormal schedules such as, inter alia, vacations, conferences, kids out of school, family in town, etc.

Figure 2:
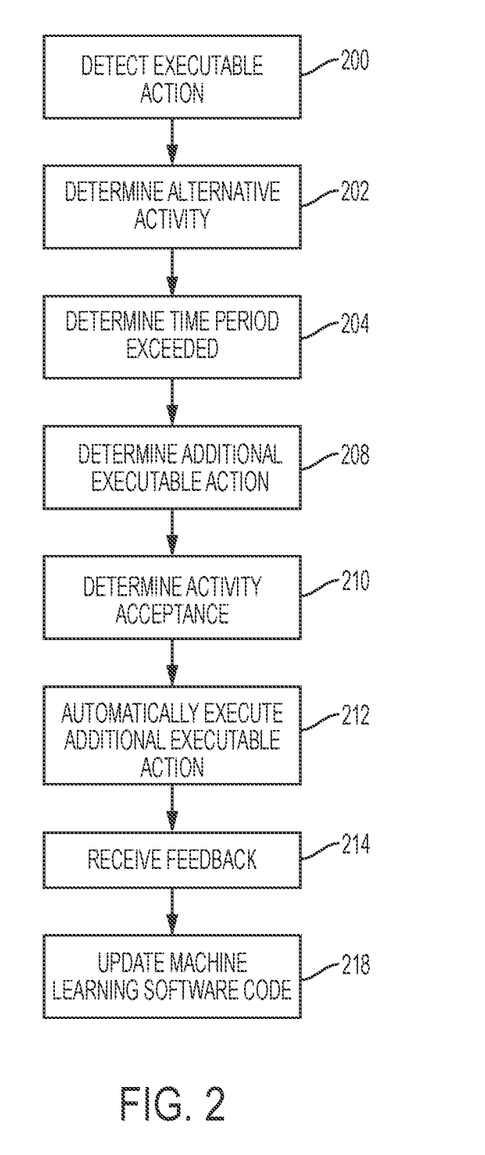
FIG. 2 illustrates an algorithm detailing a process flow enabled by the system of FIG. 1 for improving a real time action execution process with respect modifying hardware and software implemented actions, in accordance with embodiments of the present invention.

FIG. 2 illustrates an algorithm detailing a process flow enabled by system 100 of FIG. 1 for improving a real time action execution process with respect to modifying hardware and software implemented actions, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by devices 21a . . . 21n and/or hardware device 14 of FIG. 1. In step 200, an executable action is detected by a hardware device. The executable action is associated with a cancelation or a rescheduling for an originally planned activity of a user to be performed during a first time period. In step 202, an alternative activity for replacement of the original activity is determined. In step 204, it is determined that a second time period necessary for performing the alternative activity exceeds the first time period. In step 208, an additional executable action is detected. The additional executable action is configured to be combined with the alternative activity such that the alternative activity may be accommodated. The additional executable action may include automatically controlling specified hardware and/or software for implementing the alternative activity. In step 210, it is determined (based on analyses of user based data and execution of machine learning software code) that the user would be likely to accept the alternative activity if the additional executable action exceeds a specified threshold. The user based data may include data retrieved from sensors including, inter alia, GPS sensors, activity tracking sensors, social network code based sensors, etc. In step 212, the additional executable action is automatically executed in real time thereby enabling the alternative activity. The additional executable action may include notifying the user of the additional executable action being combined with the alternative activity. In step 214, feedback data associated with the additional executable action is received. In step 218, the machine learning software code is updated and configured based on the feedback data.

Figure 3:
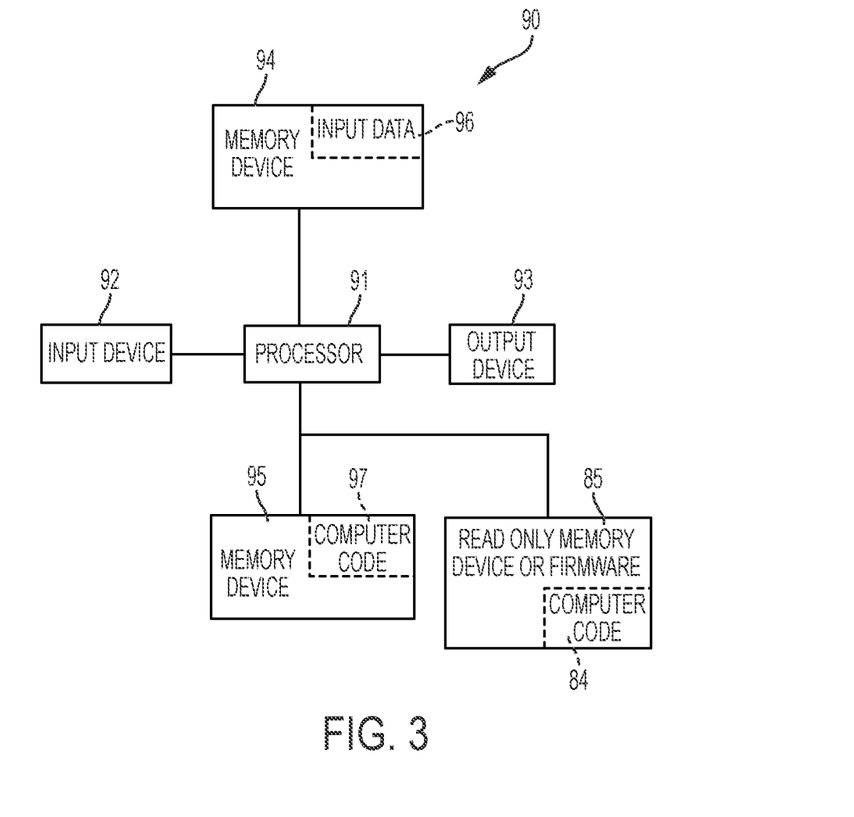
FIG. 3 illustrates a computer system used by the system of FIG. 1 for enabling a process for improving a real time action execution process with respect modifying hardware and software implemented actions, in accordance with embodiments of the present invention.

FIG. 3 illustrates a computer system 90 (e.g., devices 21a . . . 21n and/or hardware device 14 of FIG. 1) used by or comprised by the system of FIG. 1 for improving a real time action execution process with respect to modifying hardware and software implemented actions, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 3 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving a real time action execution process with respect to modifying hardware and software implemented actions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve a real time action execution process with respect to modifying hardware and software implemented actions. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving a real time action execution process with respect to modifying hardware and software implemented actions. In another embodiment, the invention provides a business method that performs the process steps of the invention on a subscription, advertising, and/or fee basis. That is, a service supplier, such as a Solution Integrator, could offer to enable a process for improving a real time action execution process with respect to modifying hardware and software implemented actions. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
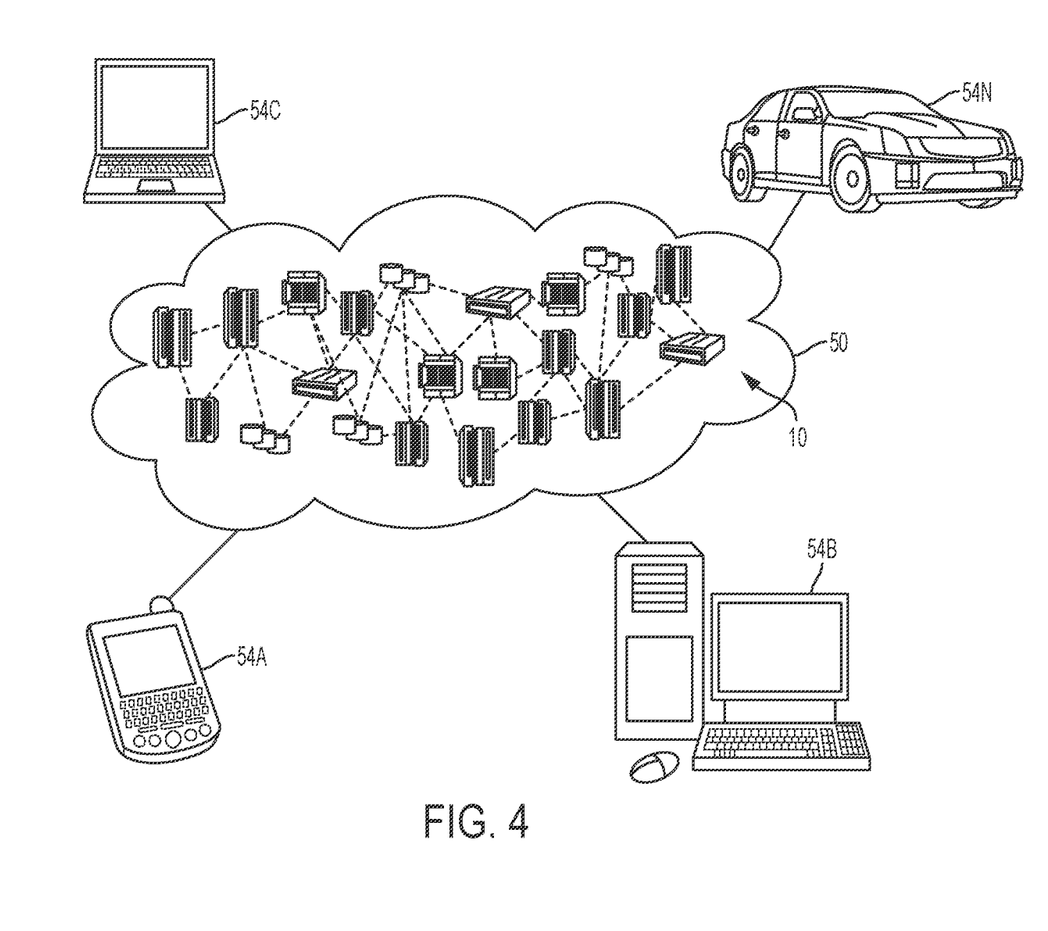
FIG. 4 illustrates a cloud computing environment, in accordance with embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 4 are intended to be illustrative only and that computing nodes 10 and cloud computing environment 50 can communicate with any type of computerized device over any type of network and/or network addressable connection (e.g., using a web browser).

Figure 5:
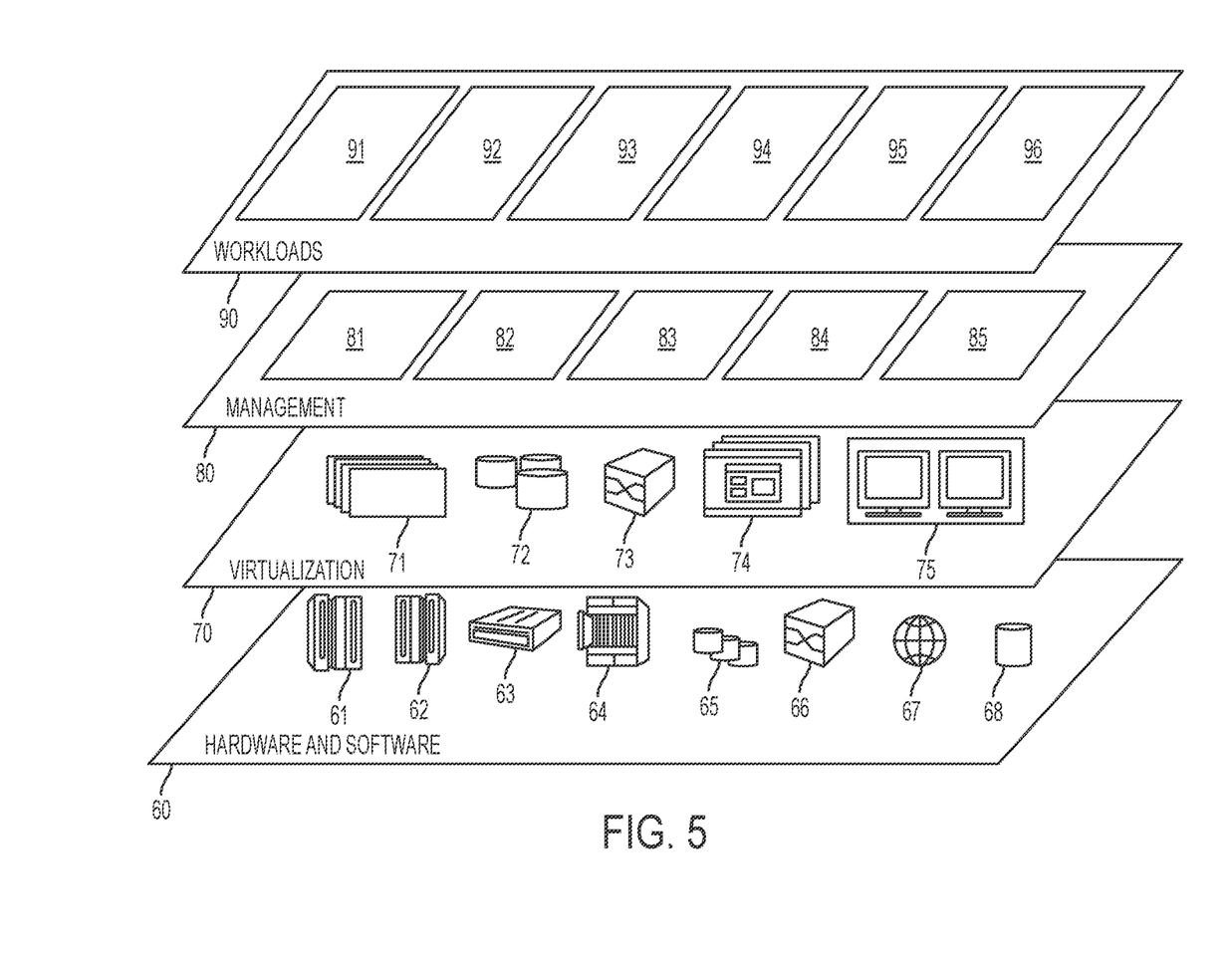
FIG. 5 illustrates a set of functional abstraction layers provided by cloud computing environment, in accordance with embodiments of the present invention.

Referring now to FIG. 5, a set of functional abstraction layers provided by cloud computing environment 50 (see FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving a real time action execution process with respect modifying hardware and software implemented actions 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer program product, comprising a computer readable hardware storage device storing a computer readable program code, said computer readable program code comprising an algorithm that when executed by a processor of a hardware device implements an action implementation improvement method, said method comprising:
    detecting, by said processor via a plurality of hardware sensors, a cancelation or a rescheduling for an originally planned activity of a user to be performed during a first time period;
    automatically applying, by said processor, user preferences of said user with respect to preferred activities of said user in order to automatically select an optimal notification time to allow sufficient time for the completion of said preferred activities;
    detecting, by said processor via a GPS sensor of said plurality of hardware sensors, a location of said user;
    detecting, by said processor via an activity tracking sensor and a heart rate monitor of said plurality of hardware sensors, an activity currently performed by said user;
    detecting, by said processor via a social network code based sensor of said plurality of hardware sensors, social network activity of said user;
    identifying, by said processor, a vacation schedule of said user;
    detecting, by said processor, a free time period for said user;
    first determining, by said processor based on said originally planned activity, said preferred activities, said location, said activity detected via said activity tracking sensor and said heart rate monitor, said vacation schedule, said free time period, and said social network activity, an alternative activity for replacement of said originally planned activity during said first time period;
    second determining, by said processor, that a second time period necessary for performing said alternative activity exceeds said first time period;
    third determining, by said processor, an executable hardware modification action, associated with resetting an alarm system, for combining with said alternative activity enabling said alternative activity to be accommodated;
    activating, by said processor, a wearable device for initializing said alarm system;
    automatically executing in real time, by said processor in response to said activating, said executable hardware modification action comprising providing a control signal to said alarm system;
    activating, by said processor in response to said control signal, electrical circuitry of said alarm system;
    resetting, by said processor in response to said activating said electrical circuitry, functionality of said alarm system;
    presenting, by said processor to said user via said alarm system, an alarm signal thereby enabling said alternative activity to enable said user to proceed to perform said alternative activity.

2. The computer program product of claim 1, wherein said executable hardware modification action comprises controlling specified hardware for implementing said alternative activity.

3. The computer program product of claim 1, wherein said executable hardware modification action comprises controlling specified software for implementing said alternative activity.

4. The computer program product of claim 1, wherein said method further comprises:
    receiving, by said processor, feedback data associated with said executable action; and
    updating, by said processor, said machine learning software code based on said feedback data.

5. The computer program product of claim 1, wherein said plurality of hardware sensors comprise sensors selected from the group consisting of GPS sensors, activity tracking sensors, and social network code based sensors.

6. The computer program product of claim 1, wherein said executable hardware modification action comprises notifying said user of said additional executable action combined with said alternative activity.

7. The computer program product of claim 1, wherein said method further comprises:
   additionally determining, by said processor based on analyses of user based data and execution of machine learning software code, if said user would be likely to accept said alternative activity if said additional executable action exceeds a specified threshold.

8. A hardware device comprising a processor coupled to a computer-readable memory unit, said memory unit comprising instructions that when executed by the computer processor implements an action implementation improvement method comprising:
   detecting, by said processor, via a plurality of hardware sensors, a cancelation or a rescheduling for an originally planned activity of a user to be performed during a first time period;
   automatically applying, by said processor, user preferences of said user with respect to preferred activities of said user in order to automatically select an optimal notification time to allow sufficient time for the completion of said preferred activities;
   detecting, by said processor via a GPS sensor of said plurality of hardware sensors, a location of said user;
   detecting, by said processor via an activity tracking sensor and a heart rate monitor of said plurality of hardware sensors, an activity currently performed by said user;
   detecting, by said processor via a social network code based sensor of said plurality of hardware sensors, social network activity of said user;
   identifying, by said processor, a vacation schedule of said user;
   detecting, by said processor, a free time period for said user;
   first determining, by said processor based on said originally planned activity, said preferred activities, said location, said activity detected via said activity tracking sensor and said heart rate monitor, said vacation schedule, said free time period, and said social network activity, an alternative activity for replacement of said originally planned activity during said first time period;
   second determining, by said processor, that a second time period necessary for performing said alternative activity exceeds said first time period;
   third determining, by said processor, an executable hardware modification action, associated with resetting an alarm system, for combining with said alternative activity enabling said alternative activity to be accommodated;
   activating, by said processor, a wearable device for initializing said alarm system;
   automatically executing in real time, by said processor in response to said activating, said executable hardware modification action comprising providing a control signal to said alarm system;
   activating, by said processor in response to said control signal, electrical circuitry of said alarm system;
   resetting, by said processor in response to said activating said electrical circuitry, functionality of said alarm system;
   presenting, by said processor to said user via said alarm system, an alarm signal thereby enabling said alternative activity to enable said user to proceed to perform said alternative activity.

9. The hardware device of claim 8, wherein said executable hardware modification action comprises controlling specified hardware for implementing said alternative activity.

10. The hardware device of claim 8, wherein said executable hardware modification action comprises controlling specified software for implementing said alternative activity.

11. The hardware device of claim 8, wherein said method further comprises:
   receiving, by said processor, feedback data associated with said executable action; and
   updating, by said processor, said machine learning software code based on said feedback data.

12. The hardware device of claim 8, wherein said cancelation or said rescheduling event is retrieved from sensors selected from the group consisting of GPS sensors, activity tracking sensors, and social network code based sensors.

\* \* \* \* \*